United States Patent [19]
Breeze

[11] Patent Number: 5,970,644
[45] Date of Patent: Oct. 26, 1999

[54] PORTABLE SELF CONTAINED FISH ATTRACTANT APPLICATOR

[76] Inventor: Thomas R. Breeze, 3221 Continental Ct., Lawrenceville, Ga. 30044

[21] Appl. No.: 08/995,633

[22] Filed: Dec. 22, 1997

[51] Int. Cl.$^6$ .............................. A01K 97/02; B05C 5/02
[52] U.S. Cl. ................................. 43/4; 118/683; 222/52; 43/44.99
[58] Field of Search ............................ 43/1, 4, 4.5, 44.99; 118/683, 300, 679; 239/578; 222/52, 175

[56] References Cited

U.S. PATENT DOCUMENTS

| | | | |
|---|---|---|---|
| 3,676,032 | 7/1972 | Meyer et al. ............................ | 425/140 |
| 4,763,434 | 8/1988 | Horneff ................................... | 43/18.1 |
| 4,771,564 | 9/1988 | Whitley .................................... | 43/4 |
| 4,977,854 | 12/1990 | Marrs ..................................... | 118/683 |

*Primary Examiner*—Jack W. Lavinder
*Attorney, Agent, or Firm*—Frank A. Lukasik

[57] ABSTRACT

A portable self-contained fish attractant applicator for dispersing fish attractant to a fishing lure consisting of a container having a removable cover, a pump housing containing a pump mounted on a back side, a mounting plate mounted on the removable cover and extending over the container, a lure guide hinged to the end of the mounting plate, and a rotary switch mounted on the mounting plate with an arm extending over the lure guide and activated by the lure guide when pulled upwardly by a lure.

2 Claims, 4 Drawing Sheets

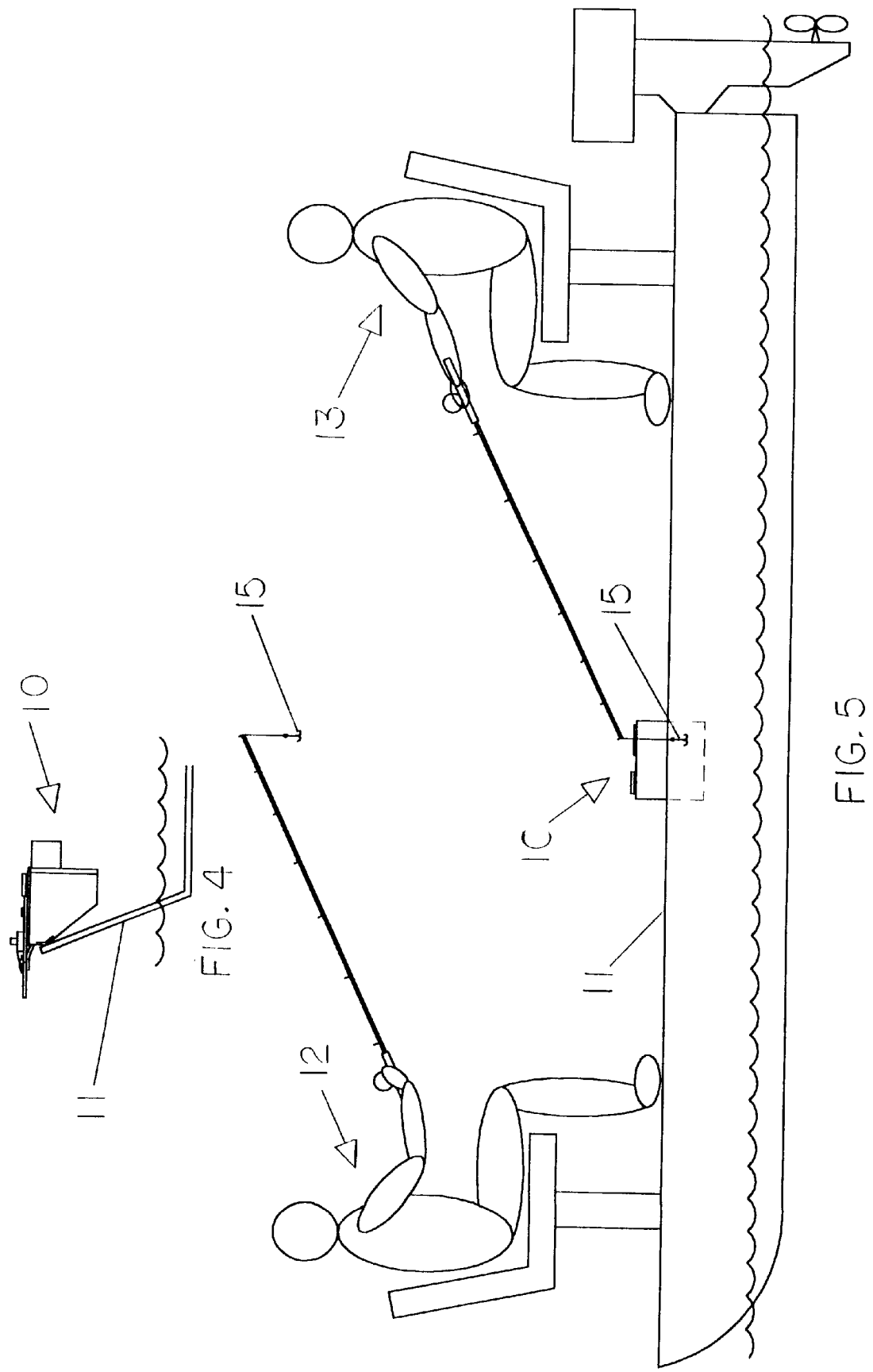

1

PORTABLE SELF CONTAINED FISH ATTRACTANT APPLICATOR

BACKGROUND OF THE INVENTION

1. Field of the Invention

The present invention relates generally to fish attractants, and more particularly to a self-contained dispenser for dispersing fish attractant to a fishing lure.

2. Description of the Prior Art

Fish attractant is applied to artificial or live bait, and when detected by fish, induces a feeding response. Commercially available fish attractants are viscous and have a strong, unpleasant odor. In use, the fisherman cranks the bait so that it dangles several feet from the rod tip. He then applies the attractant from a hand spray bottle, aerosol dispenser, squeeze bottle, or by dipping the bait in the attractant or by rubbing it on with a cloth. If the wind is blowing or if the boat is rocking, he may have trouble hitting the bait. It is also difficult for a fisherman to apply the attractant without spraying some of it on his hands and clothing or boat and the operation results in lost times between casts.

One such prior art device is shown in U.S. Pat. No. 4,977,854 to Marrs which discloses a remote dispenser for fish attractant comprising a reservoir for containing the fish attractant, a pump responsive to a switch controlled by the fisherman for transferring the fish attractant from the reservoir to the outlet. A proximity switch responsive to movement of a fishing lure in front of the nozzle and the system includes a timing circuit for automatically returning the switch to its initial condition stopping the pump.

In view of the above, there is a need for a dispenser for dispensing fish attractant which is easy and quick to use and which dispenses the attractant on the bait without getting it on the fisherman, his clothes or the boat.

It is therefore an object of the invention to provide a totally self-contained dispenser without the need for remote reservoir hoses and switches that must be permanently installed.

It is another object of the invention to provide a fish attractant dispenser which can be easily installed and removed in a matter of minutes for security reasons or for re-installation on another craft.

The invention accordingly comprises the constructions described below and their equivalents, the scope of the invention being indicated in the claims.

SUMMARY OF THE INVENTION

In the present invention, fish attractant is applied through an outlet remote form the fisherman, preferably on the top edge of a boat pointing outwardly. The unit is activated by positioning the bait or artificial lure in the "V" cut lure guide. Upon applying an upward pressure, a roller switch activates the pump and the attractant is forced through the transfer tube and is dispersed through the nozzle.

BRIEF DESCRIPTION OF THE DRAWINGS

FIG. 4 is a side view of a fish attractant applicator mounted on the side of a section of a boat in accordance with the invention.

FIG. 5 is a side view of a fish attractant applicator mounted on the side of a boat in use by two fishermen.

DETAILED DESCRIPTION OF THE INVENTION

Figure 1:
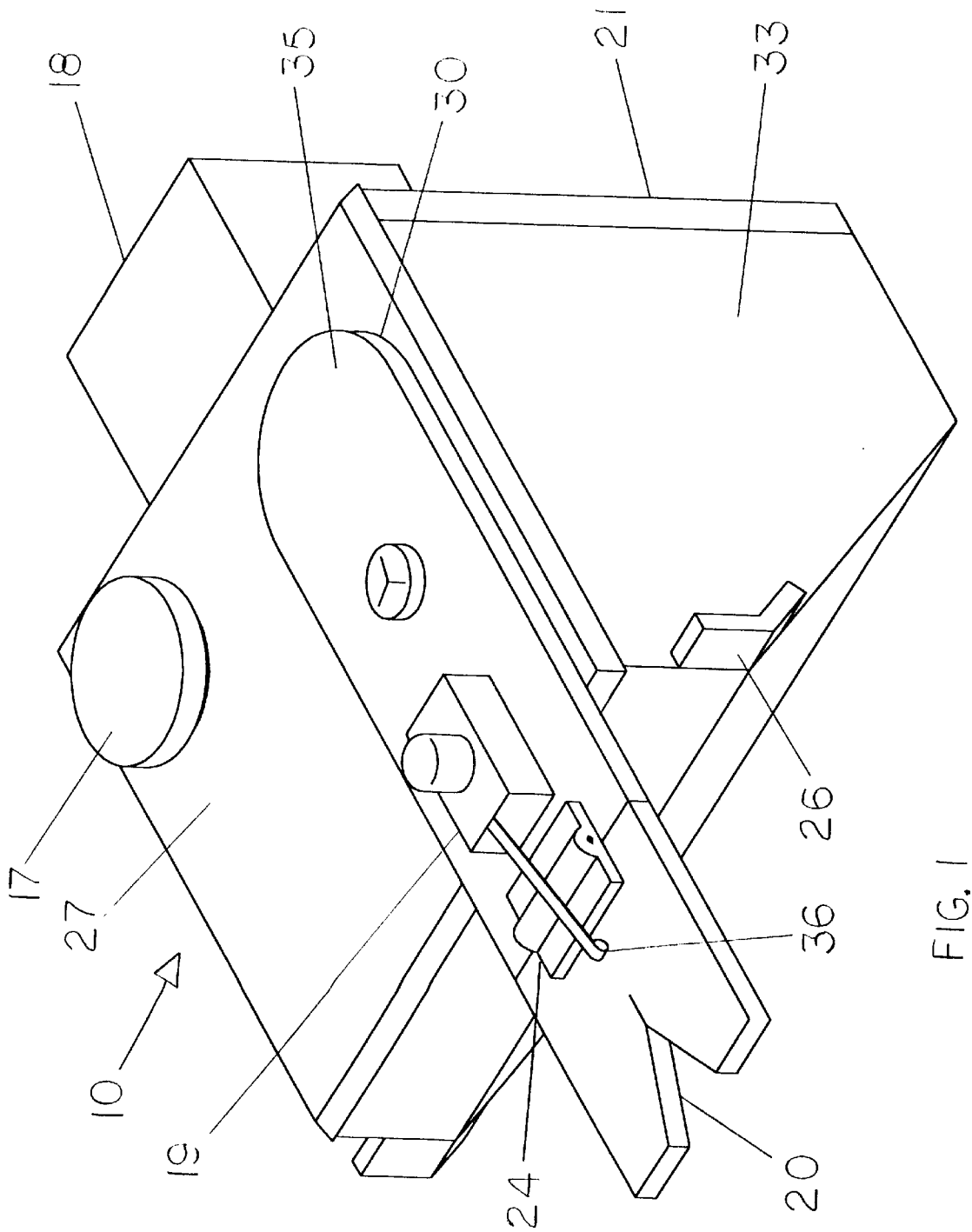
FIG. 1 is a top perspective view of a fish attractant applicator in accordance with the present invention.
Figure 2:
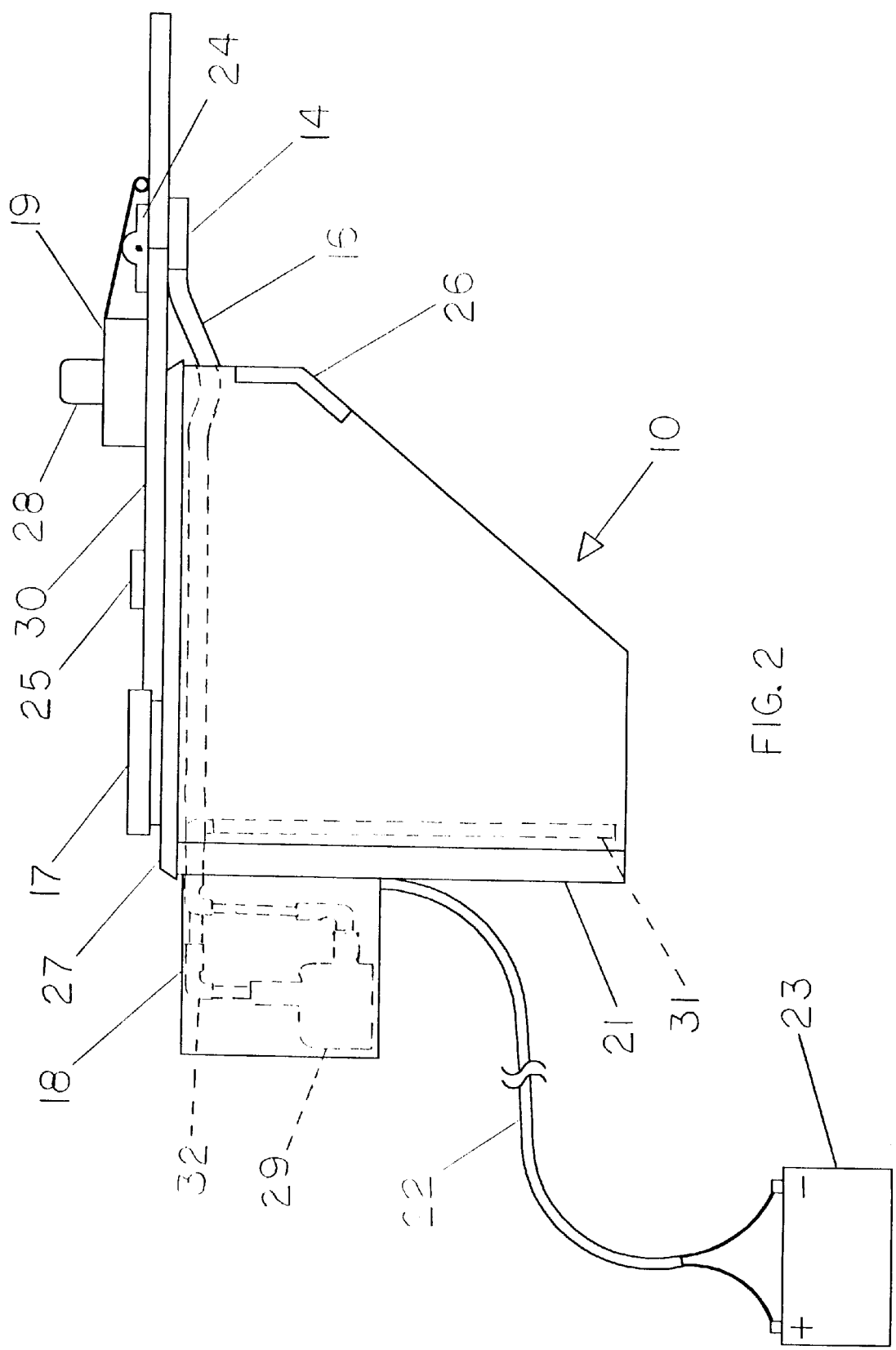
FIG. 2 is a side view of a fish attractant in accordance with the invention.
Figure 3:
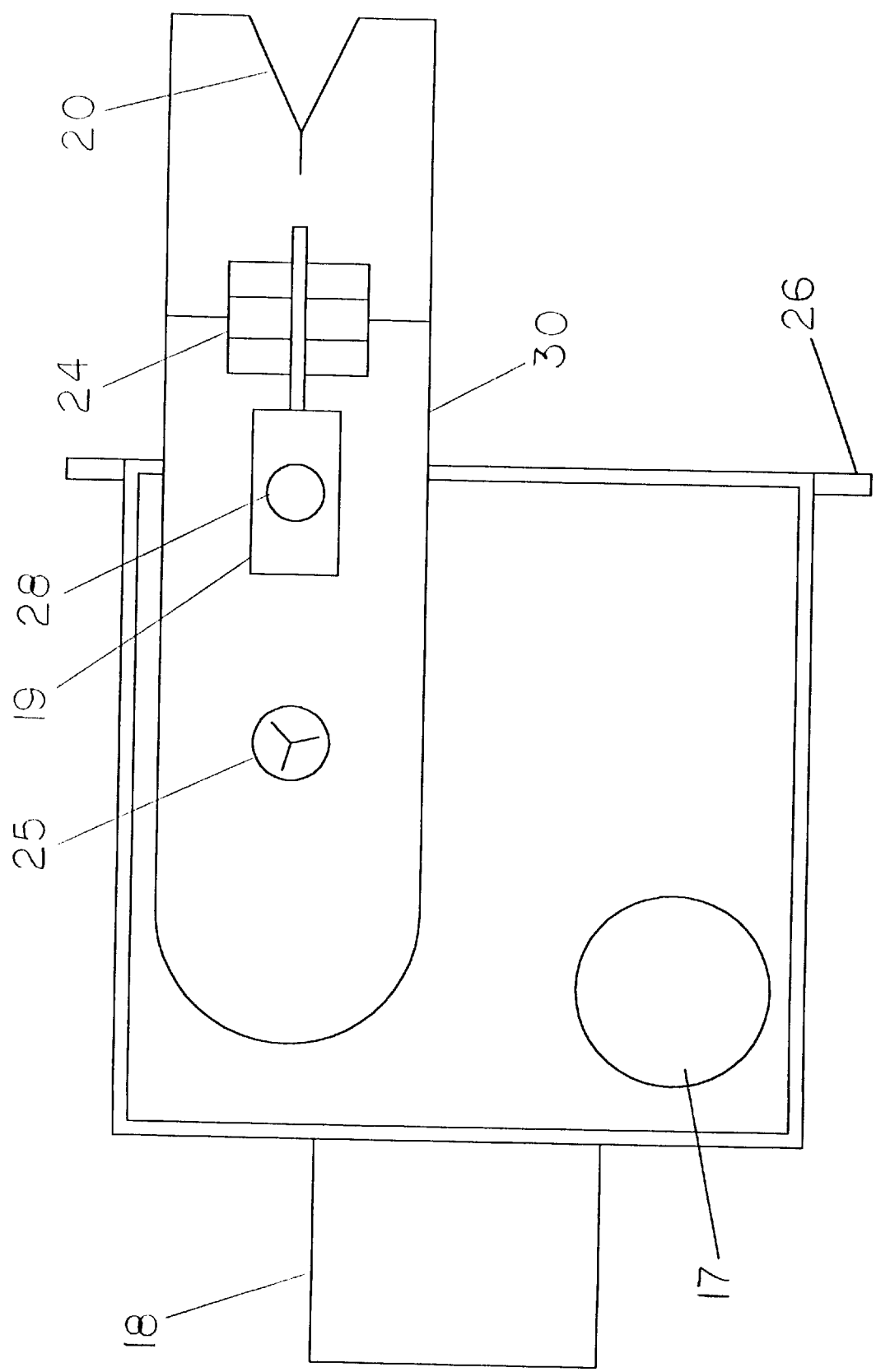
FIG. 3 is a top view of a fish attractant in accordance with the invention.

Referring to FIGS. 1 through 4, a fish attractant applicator is designated generally by the numeral 10. The present invention consists of a totally self-contained applicator which can be mounted on a side of a boat 11 with ears 26 which can be fastened with screws or clamped with a "C" clamp to the side or front of a boat 11. Dispenser 10 is comprised of a fish attractant container 33 which serves as a storage tank for the attractant and a mounting base, top 35, for the dispensing system described below.

Mounting plate 30 is mounted on removable service cover 27 with break-away swing pivot 25. "V" cut lure guide 20 is pivotally mounted with hinge 24 to mounting plate 30. Lure guide 20 is a generally flat, rectangular plate with a "V" notch 20 on the end opposite the hinge 24. Roller switch 19 is mounted on the top surface 35 of mounting plate 30. Switch arm 36 of switch 19 is placed over the hinge 24 with the switch arm 36 touching the lure guide 20. Pump housing 18 contains a twelve volt pump 29 which is powered by a 12 Volt DC battery 23 through cable 22.

Attractant is loaded into the container 33 through fill cap 17. Intake hose 31 is installed in the container 33, and connected to the intake of pump 29 located in pump housing 18. Output hose 32 is connected to the output of pump 29 and provides attractant to attractant transfer tube 16 and nozzle 14. Attractant view gauge 21 is affixed to the container 33 to provide an indication of the level of attractant available for use. A low intensity lure guide night light 28 is mounted on the top surface of roller switch 19 for illuminating the lure guide 20 during night fishing.

FIGS. 4 and 5 are side views of a boat 11 with two fishermen 12 and 13 using a fish attractant applicator 10 of the invention. With the applicator 10 in the location shown, each of the fishermen 12 and 13 have access to the attractant. FIG. 5 shows the fisherman 13 with the lure 15 in position in the lure guide 20 prior to operation of the pump 29 motor to spray the lure 15 with attractant. In operation, the fisherman 13 lifts the lure 15 upwardly until the roller switch 19 is activated. As the lure 15 is sprayed with attractant, the lure guide 20 is lifted to a point where the lure 15 is released and ready for casting.

The above description is of the preferred embodiment, however, the attractant may also be propelled by compressed propellant cartridges of various types, such as a CO2 cartridge, or any type of manual pump. The roller switch 19 may be almost any type, for example, a motion detector type, proximity type, a metal or mass sensory device or most any type of manual switch. The attractant applicator 10 may also be activated by a remote, foot-operated switch.

While a principle of the present invention has been described above in connection to a preferred embodiment of the invention, it is intended that all matter contained in the above description and illustrated in the accompanying drawings shall be interpreted to be illustrative and not in a limiting sense.

What is claimed is:

1. A portable self-contained fish attractant applicator for dispersing fish attractant to a fishing lure, said applicator comprising:

a container having a front side, a back side, a top opening, a removable service cover, a fill-cap mounted in said service cover, and a view gauge mounted on said container a pump housing mounted on said container back side, said housing having a DC powered pump mounted therein, and said pump having an intake hose and an output hose, said intake hose being connected within said container, a mounting plate having a top side and an underside, said mounting plate being pivotally mounted on said service cover, and having a first end extending over said container front side, said mounting plate having a first end of a hinge fastened thereto, and a "V" cut lure guide pivotally fastened to a second end of said hinge, a spray nozzle mounted on said mounting plate underside and under said lure guide, and a roller switch mounted on said mounting plate, said switch having an arm extending over said hinge and contacting said lure guide, whereby lifting said lure guide with a lure, applies power to said pump and dispenses attractant through said spray nozzle and onto the lure.

2. A portable self-contained fish attractant applicator as claimed in claim 1 wherein a low intensity guide light is mounted on said roller switch.

* * * * *